United States Patent
Maaref et al.

(10) Patent No.: US 12,004,201 B2
(45) Date of Patent: Jun. 4, 2024

(54) SIDELINK CONFIGURED GRANT RESOURCE CONFIGURATION AND SIGNALLING

(71) Applicants: Amine Maaref, Ottawa (CA); Yu Cao, Ottawa (CA); Yongxia Lyu, Ottawa (CA); Jianglei Ma, Ottawa (CA)

(72) Inventors: Amine Maaref, Ottawa (CA); Yu Cao, Ottawa (CA); Yongxia Lyu, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/992,921

(22) Filed: Aug. 13, 2020

(65) Prior Publication Data

US 2021/0051646 A1    Feb. 18, 2021

Related U.S. Application Data

(60) Provisional application No. 62/888,416, filed on Aug. 16, 2019.

(51) Int. Cl.
| | |
|---|---|
| *H04W 72/04* | (2023.01) |
| *H04W 72/02* | (2009.01) |
| *H04W 72/044* | (2023.01) |
| *H04W 72/12* | (2023.01) |
| *H04W 72/23* | (2023.01) |
| *H04W 72/30* | (2023.01) |
| *H04W 72/51* | (2023.01) |

(52) U.S. Cl.
CPC ........... *H04W 72/51* (2023.01); *H04W 72/02* (2013.01); *H04W 72/044* (2013.01); *H04W 72/23* (2023.01); *H04W 72/30* (2023.01)

(58) Field of Classification Search
None
See application file for complete search history.

(56) References Cited

U.S. PATENT DOCUMENTS

| | | | | |
|---|---|---|---|---|
| 2017/0230972 | A1* | 8/2017 | Wang | H04W 72/0446 |
| 2018/0049084 | A1* | 2/2018 | Lee | H04W 36/06 |
| 2018/0139724 | A1* | 5/2018 | Loehr | H04W 72/02 |
| 2018/0263026 | A1* | 9/2018 | Loehr | H04W 72/10 |
| 2019/0124715 | A1* | 4/2019 | Chen | H04W 76/27 |
| 2019/0229964 | A1 | 7/2019 | Ouchi et al. | |
| 2019/0268920 | A1* | 8/2019 | Falahati | H04W 88/08 |
| 2019/0357178 | A1* | 11/2019 | Bae | H04W 72/569 |
| 2020/0045722 | A1* | 2/2020 | Bae | H04L 5/0078 |

(Continued)

FOREIGN PATENT DOCUMENTS

CN            109845382 A        6/2019

OTHER PUBLICATIONS

Huawei, HiSilicon, Sidelink resource allocation mode 2 for NR V2X. 3GPP TSG RAN WG1 Meeting #97, Reno, USA, May 13-17, 2019, R1-1906011, 13 pages 2019.

(Continued)

*Primary Examiner* — Sai Aung

(57) ABSTRACT

A method for transmitting data over a SL data channel wherein a transmit UE and a receive UE are each semi-statically provided with a CG configuration such that a CG configuration indication does not have to be transmitted in association with each individual data transmission during a duration that the CG configuration is applied.

25 Claims, 8 Drawing Sheets

(56) References Cited

U.S. PATENT DOCUMENTS

| | | | |
|---|---|---|---|
| 2020/0169984 A1* | 5/2020 | Lee | H04W 4/40 |
| 2020/0178292 A1* | 6/2020 | Kim | H04B 7/14 |
| 2021/0282143 A1* | 9/2021 | Lee | H04W 76/14 |
| 2021/0314917 A1* | 10/2021 | Lee | H04W 72/02 |
| 2021/0336688 A1* | 10/2021 | Lee | H04B 7/088 |
| 2022/0295509 A1* | 9/2022 | Behravan | H04W 72/0446 |
| 2022/0361183 A1* | 11/2022 | Behravan | H04W 72/56 |

OTHER PUBLICATIONS

Huawei, HiSilicon, Discussion on sidelink resource allocation mode 1. 3GPP TSG RAN WG1 Meeting #97, Reno, USA, May 13-17, 2019, R1-1906010, 9 pages 2019.

Huawei, HiSilicon, Sidelink resource allocation mode 2 for NR V2X. 3GPP TSG RAN WG1 Meeting #96bis, Xi an, China, Apr. 8-12, 2019, R1-1903947, 14 pages 2019.

Huawei et al: Discussion on sidelink resource allocation mode 3GPP Draft; R1-1906010, pp. 1-9, XP051708052. May 3, 2019.

ITRI: "Considering on NR Sidelink Resource Allocations using Mode 1", 3GPP Draft; R1-1907231, XP051728674, total 10 pages May 13, 2013.

\* cited by examiner

SIDELINK CONFIGURED GRANT RESOURCE CONFIGURATION AND SIGNALLING

REFERENCE TO RELATED APPLICATIONS

This application claims the benefit of and priority to U.S. Provisional Patent Application No. 62/888,416 filed Aug. 16, 2019, entitled "SIDELINK CONFIGURED GRANT RESOURCE CONFIGURATION AND SIGNALLING" the content of which is incorporated herein by reference.

FIELD

The Application relates to methods and apparatus for configured grant resource configuration and signaling in respect of sidelink communications.

BACKGROUND

Vehicle to everything (V2X) refers to a category of communications scenarios that can include, among other things, communication between a vehicle and another vehicle (V2V), vehicle to infrastructure (V2I), vehicle to pedestrian (V2P), vehicle to network (V2N) and other scenarios. In V2X, the transmission can be done through a link between a network and a user equipment (UE), such as uplink (UL) and downlink (DL), or through a sidelink between UE and UE (SL). UE cooperation can be used to enhance the reliability, throughput, and capacity of V2X communications, as well as next generation wireless communications in general.

Current Long Term Evolution (LTE) standards define an LTE V2X transmission scheme that relies on the concept of a transmit and receive resource pool (RP). A resource pool includes a set of time-frequency resources which can be contiguous or non-contiguous in time and or frequency. The resource pool may consist of sub-channels where a sub-channel consists of a group of contiguous resource blocks (RBs) in a same subframe.

The current LTE V2X transmission scheme includes two transmission modes: mode 3 and mode 4. In mode 3, a base station (BS) schedules time-frequency resources (from the UE's resource pool) for SL transmission using downlink control information (DCI), either dynamically or semi-persistently. In mode 4, UE randomly selects resources within its transmit RP.

New V2X schemes are being developed beyond the current LTE V2X standards. For example, the $3^{rd}$ Generation Partnership Project (3GPP) is now working on Release 16 New Radio (NR) V2X standardization. NR V2X will support two SL transmission modes, referred to as NR Mode 1 and NR Mode 2. In NR Mode 1, the BS (for example a gNB node or eNB in the case of LTE controlling NR sidelink) controls SL transmission and specifies resources that UEs will use for SL transmission. In NR Mode 2, the UE determines or selects a resource among a resource pool.

A number of the details of regarding SL resource configuration in respect of NR V2X Mode 1 and Mode 2 are still undeveloped. Accordingly, there is a need for systems and methods that enable configured grant (CG) resource allocation and signaling for sidelink communication in a resource efficient and reliable manner, both for NR V2X Mode 1 and Mode 2 applications and for other applications.

SUMMARY

According to one aspect of the present disclosure, example embodiments are directed towards transmitting data by a transmitting (Tx) UE in a SL data channel without accompanying dynamic scheduling information in cases where a receiving UE can rely on a previously known sidelink CG configuration. In example embodiments, a Tx UE and receiving (Rx) UE are each semi-persistently or semi-statically provided with a CG configuration that can be used for multiple SL data transmissions such that a CG configuration indication does not have to be transmitted in association with each individual data transmission during a duration that the CG configuration is applied.

According to a second example aspect is a method for transmitting data over a sidelink (SL) data channel comprising: transmitting, by a transmitting (Tx) user equipment (UE), one or more SL data transmissions using SL resources specified by a configured grant (CG) configuration without transmitting accompanying information indicating the SL resources.

In some examples of the second aspect, the method comprises, prior to the transmitting: first transmitting, by the Tx UE, information indicating the CG configuration to a receiving (Rx) UE using a SL channel.

In some examples of the second aspect, the method comprises, selecting, at the UE, an updated CG configuration and transmitting information indicating the updated CG configuration for the Rx UE.

In some examples of the second aspect, the method comprises transmitting a plurality of SL data transmissions using the SL resources specified by the CG configuration, and then transmitting a further plurality of SL data transmissions using SL resources specified by the updated CG configuration In some examples of the second aspect, the method comprises, prior to the first transmitting, receiving by the Tx UE, signaling from a base station (BS) indicating the CG configuration.

In some examples of the second aspect, the first transmitting of the information indicating the CG configuration to the receiving (Rx) UE is performed using SCI in an SL control channel.

In some examples of the second aspect, the first transmitting of the information indicating the CG configuration to the receiving (Rx) UE is performed using radio resource control (RRC) signaling in the SL channel.

In some examples of the second aspect, the first transmitting of the information indicating the CG configuration to the receiving (Rx) UE is performed physical layer broadcast channel (PSBCH).

In some examples of the second aspect, the method comprises, prior to the transmitting: receiving by the Tx UE, signaling from a base station (BS) indicating the CG configuration; and receiving by a Rx UE, signaling from a base station (BS) indicating the CG configuration.

According to example aspects is a Tx UE configured to operate as a transmit UE to perform the methods of the preceding aspects, and an Rx UE configured to receive transmissions for the Rx UE according to the methods of the preceding aspects.

According to a further example aspect is a method performed at a transmit (Tx) user equipment (UE) configured for wireless sidelink (SL) communication, comprising: transmitting, for a receiving (Rx) UE, a first SL signal indicating parameters of a configured grant (CG) configuration; and transmitting multiple SL data transmissions for the Rx UE in a SL data channel according to the parameters, wherein at least one of the SL data transmissions is transmitted without an accompanying transmission in a SL control channel indicating the parameters.

According to some examples of the preceding aspect, the first SL signal comprises sidelink control information (SCI) and is transmitted in the SL control channel.

According to some examples, the method of the preceding aspects includes selecting, at the Tx UE, based on SL channel information sensed by the Tx UE, updated CG configuration parameters and transmitting, for the Rx UE, a second SL signal indicating the updated CG configuration parameters. In some examples, of the preceding aspects, the method includes transmitting multiple SL data transmissions for the Rx UE according to the updated CG configuration parameters, wherein at least one of the SL data transmissions is transmitted without an accompanying transmission indicating the updated CG configuration parameters. In some examples, the updated CG configuration parameters update only a subset of the parameters indicated in the first signal.

In some example of the preceding aspects, the CG configuration relates to a grant free (GF) configuration for a broadcast for multiple Rx UEs, wherein the first SL signal is transmitted for multiple Rx UEs and: (i) the first SL signal comprises sidelink control information (SCI); or (ii) the first SL signal is transmitted using a PSBCH transmission, the method further comprising transmitting a second SL signal in a SL data channel for the multiple Rx UEs indicating updated CG configuration parameters.

In some examples of the preceding aspects, the CG configuration includes a set of parameters selected from a group including: (1) destination ID of one or more Rx UEs; (2) source ID of the Tx UE; (3) SL data channel time-frequency resource; (4) modulation and coding scheme (MCS) parameters to be used for SL data transmission; and (5) demodulation reference signal (DMRS) parameters.

In some examples of the preceding aspects, the Tx UE semi-statically applies the CG configuration such that the parameters do not have to be transmitted in association with each individual SL data transmission from the Tx UE to the Rx UE during a duration that the CG configuration is applied.

In some examples of the preceding aspects, the Tx UE is transmits an indication of one or both of a source ID for the Tx UE or a destination ID for the Rx UE. In such some examples, the Tx UE may transmit the indication for the Rx UE in the SL data channel. In some examples, transmitting the indication may be done by coding a Medium Access Control-Control Element (MAC-CE) that indicates one or both of the source ID and destination ID, and jointly coding the MAC-CE with payload data in one of the multiple data transmissions. A radio resource control (RRC) signal in the data channel may be transmitted indicating that the MAC-CE is jointly coded with the payload data. In other examples, transmitting the indication is done by transmitting the indication using a SL data channel time-frequency resource that is not sued for any of the multiple SL data transmissions.

According to a further example aspect is a transmitting (Tx) user equipment (UE) configured to perform wireless sidelink (SL) communications with one or more receiving (Rx) UEs. The Tx UE is configured to: transmit, for a Rx UE, a first SL signal indicating parameters of a configured grant (CG) configuration; and transmit multiple SL data transmissions for the Rx UE according to the parameters, wherein at least one of the SL data transmissions is transmitted without an accompanying transmission in a SL control channel indicating the parameters. In some example embodiments, the Rx UE determines the CG configuration by receiving sidelink control information (SCI) over the SL control channel indicating the CG configuration, and at least one of the plurality of discrete SL data transmissions is received over an SL data channel without accompanying SCI indicating the CG configuration.

According to a further example aspect, a transmitting (Tx) user equipment (UE) is configured to perform wireless sidelink (SL) communications with one or more receiving (Rx) UEs, the Tx UE being configured to: transmit one or more SL data transmissions using SL resources specified by a configured grant (CG) configuration without transmitting accompanying information indicating the SL resources.

According to a further example aspect, a computer program product is discloses that includes a non-transitory storage storing computer implementable instruction for configuring a transmitting (Tx) user equipment to: transmit one or more SL data transmissions using SL resources specified by a configured grant (CG) configuration without transmitting accompanying information indicating the SL resources.

According to a further example aspect, a method for receiving data over a sidelink (SL) data channel is disclosed, including determining, at a receiving (Rx) user equipment (UE), a configured grant (CG) configuration to use for processing SL data transmissions received by the Rx UE; and processing a plurality of discrete SL data transmissions using the CG configuration.

According to a further example aspect, a receiving (Rx) user equipment (UE) configured to receive wireless sidelink (SL) communications from a transmitting (TX) UE is disclosed. The Rx UE is configured to: determine a configured grant (CG) configuration to use for processing SL data transmissions received by the Rx UE; and process a plurality of discrete SL data transmissions using the CG configuration.

BRIEF DESCRIPTION OF THE DRAWINGS

Embodiments of the disclosure will now be described with reference to the attached drawings in which.

DETAILED DESCRIPTION

Figure 1:
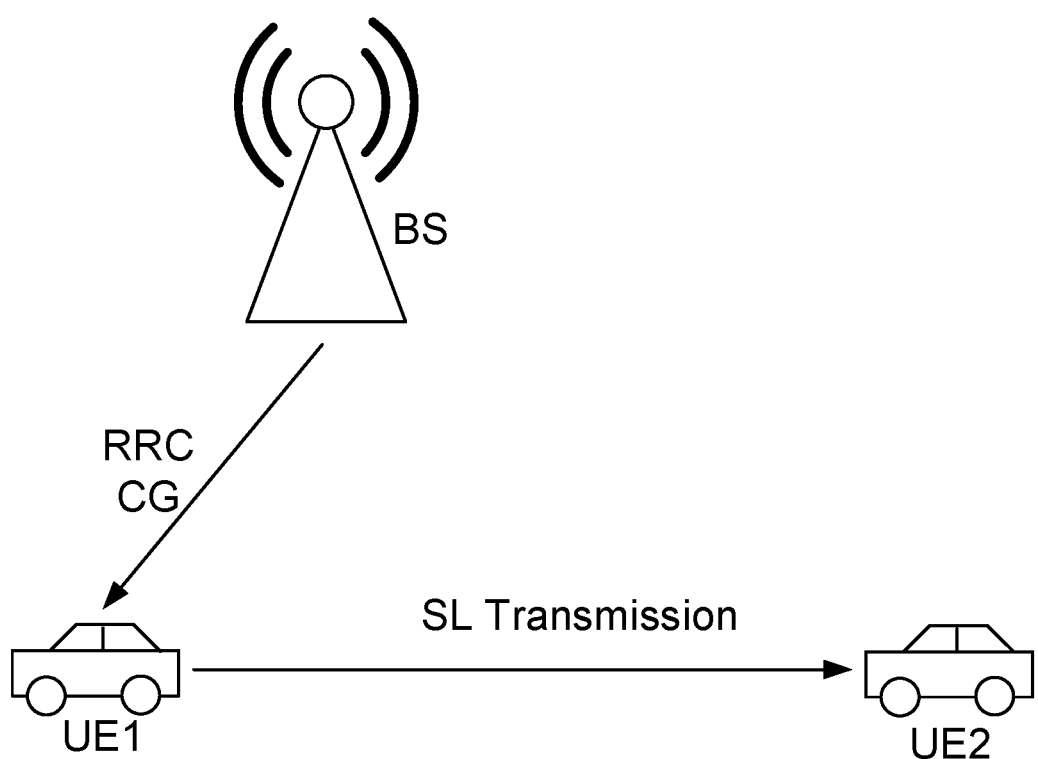
FIG. 1 is a block diagram illustrating communication of a configured grant for purposes of sidelink communication according to an example embodiment.

Example embodiments are described that apply generally to any communication system where UEs are semi-statically granted resources for sidelink (SL) communications.

As noted above, in the context of V2X, SL refers to a communication between UE and UE. This direct UE to UE communication may for example use the PC5 air interface.

A UE to UE SL data transmission involves transmission of a unit of data, for example a transport block (TB), using a wireless SL data channel (e.g. a physical sidelink shared channel (PSSCH)). Typically the SL data channel is subdivided into sets of transmission resources (for example time/frequency resources that have a respective time duration and frequency bandwidth) and these transmission resources are shared by a group of UEs. In a configured grant scenario, a transmitting UE is allocated a specific set of transmission resources that can be used by that UE for an SL data transmission over the SL data channel without dynamic scheduling. In the case where a base station directs the use of SL transmission resources between UEs, the allocation of a set of transmission resources is dynamically indicated through a dynamic grant or semi-statically configured by way of a configured grant (CG). In particular, an SL CG configuration specifies a set of SL resources and other communication parameters that can be used by a UE.

The SL CG configuration may include a transmitting (Tx) CG configuration and a receiving (Rx) CG configuration. A UE can have a Tx CG configuration and a Rx CG configuration simultaneously. By way of non-limiting example, the SL CG configuration for both Tx and Rx configurations can specify resource and other parameters such as: (1) Time domain resource configuration parameters such as: periodicity, offset, and size of time domain allocation; symbols used for PSSCH transmission; and bitmap for time location of each repetition; (2) Frequency domain resource configuration parameters such as: subchannel definition: starting resource block (RB), ending RB, and size of subchannel in terms of RB; starting location and size of PSSCH transmission (in RB or subchannels); and frequency hopping information or frequency subchannel index of each repetition; (3) Resource pattern or time-frequency resource pattern (TFRP); (4) Repetition number K (where K specifies the number of times a TB is transmitted); (5) Redundancy Version (RV) sequence; (6) Demodulation reference signal (DMRS) configuration; (7) Modulation and coding scheme (MCS) configuration; (8) Hybrid automatic repeat request (HARQ) related parameters; (9) Power control parameters; (10) Destination ID; and (11) Source ID. Accordingly, in example embodiments, a CG configuration can include, among other things, a set of parameters selected from a group including: (1) destination ID of one or more Rx UEs; (2) source ID of the Tx UE; (3) SL time-frequency resource; (4) modulation and coding scheme (MCS) parameters to be used for SL data transmission; and (5) Demodulation reference signal (DMRS) parameters. SL time-frequency resource parameters can specify one or more of the time domain resources and frequency domain resources noted above.

New Radio (NR) Mode 1 supports two types (Type-1, Type-2) of configured grant (CG) that provide resource configurations in a periodic manner for SL transmissions. For Type 1 CG, a resource configuration is provided by radio resource control (RRC) signaling. For CG Type 2, a resource configuration is provided by a combination of RRC signaling and downlink control information (DCI) signaling. NR Mode 1 will also support a dynamic grant that provides resources for one or multiple SL transmissions of a single TB.

With reference to FIG. 1, in the case of NR Mode 1, Type 1, a BS provides an SL CG configuration to a UE (e.g., UE1). For example, the BS may send configured grant information to UE1 that indicates an SL CG configuration. The configured grant information is transmitted to UE1 from a BS (for example a gNB node) using RRC signaling. The configured grant information indicates an SL CG configuration that UE1 can use for SL communications with one or more further UEs (e.g., UE2). In some cases, the configured grant information indicates one or more SL CG configurations from a set of candidate SL CG configurations that UEs have been preconfigured with. In some examples, the configured grant information may specify updates to one or more selected parameters of a set of CG configuration parameters. The configured grant information sent from the BS to UE1 is not dynamic; accordingly the SL CG configuration provided to the UE1 is semi-static (e.g., the BS does not provide a new SL CG configuration to the UE for every data transmission; the SL CG configuration is provided for a duration that may cover multiple discrete SL data transmissions) and the SL resources (e.g. resource parameters specified in the SL resource configuration) for UE1 are configured semi-statically (e.g. the SL resources are not changed every for every data transmission; the configured SL resources may cover multiple SL data transmissions). For a period that spans multiple SL data transmissions, there is no dynamic DCI signaling from the BS to update or change the CG configuration that is specified in the CG information sent using RRC signaling.

After receiving an SL CG configuration from the BS, UE1 can send an SL data transmission to other UEs (e.g., UE2) using transmission resources and other parameters corresponding to the SL CG configuration indicated in the CG transmission. The SL data transmission can take the form of a transport block (TB) sent over a SL data channel (e.g., physical sidelink shared channel (PSSCH)) using transmission resources specified by the SL CG configuration. In some proposed or existing V2X SL scenarios, each TB is accompanied by sidelink control information (SCI) sent over a control channel (physical sidelink control channel (PSCCH)). In the case where a TB has associated SCI, information about the SL CG configuration used for the TB is specified in the SCI such that a receiving UE (e.g., UE2) can determine the SL CG configuration (or selected parameters of the SL CG configuration) by decoding the SCI.

In some proposed or existing V2X SL scenarios, a UE (e.g., UE1) may transmit a TB on a SL data channel without accompanying control channel SCI. In such a scenario, the receiving UE uses other methods to identify the SL CG configuration, such as demodulation reference signals (DMRS) transmitted in the SL data channel in association with each TB transmission.

As noted above, the CG configuration used by a UE can be semi-persistent such that the UE can use the same transmission resources and other communication parameters for multiple SL TB transmissions over a time duration. The present disclosure describes methods and systems for reducing system overhead and improving communication and UE efficiency by taking advantage of the semi-persistent or semi-static nature of CG configurations. In particular, example embodiments are directed towards transmitting data in a SL data channel without accompanying CG configuration information in cases where an Rx UE can rely on a previously known CG configuration. On example embodiments, at least some SL TB transmissions in a SL data channel are transmitted without an accompanying transmission indicating CG configuration parameters in an SL control channel.

In this regard, example embodiments are directed to reducing signaling about CG configuration by relying on the semi-static configuration information and thereby avoiding dynamic signaling. This may, in some scenarios, reduce physical layer control channel signaling overhead.

In the case where NR V2X is applied to vehicle UEs, the UEs are frequently moving, often at different speeds and the neighborhood of a given UE may change rapidly, thus requiring fast adaptation of CG configuration parameters for UE to UE SL communication. Example embodiments are directed to adapting and/or updating these CG configuration parameters in a dynamic manner and signaling the adapted and/or updated parameters to Rx UEs in case of configured grant schemes that rely on Tx and/or Rx UE pre-configuration and not necessarily relying on transmitting SCI for every transport block (TB).

In example embodiments, SCI can trigger parameter adaptation when needed, but the adaptation goes on without SCI accompanying each TB transmission. The CG configuration parameters used by a UE can be (pre)configured either by RRC signaling or via pre-configuration in the UE but there is a possibility to send a one-time SCI to inform the Rx UE of a change of a CG configuration parameter value, after which the Rx UE assumes the updated parameter value for subsequently received TBs.

According to some embodiments, the Rx UE keeps the same updated CG configuration after receiving the one-time SCI unless or until it receives another one-time update SCI In another embodiment, the Rx UE receives, associated with a data transmission, an SCI indicating an updated CG configuration for that specific data transmission. The Rx UE uses the updated CG configuration for just that one-time data transmission associated with the one-time SCI (or in some examples for a defined period of time immediately after receiving the updated CG configuration SCI), and then reverts back to using the CG configuration that was being applied before the updated CG configuration.

Example embodiments will be described in respect of three types of SL transmissions, namely unicast, groupcast and broadcast. Unicast refers to a communication between a single Tx UE and a single Rx UE. Groupcast refers to a Tx UE sending an SL transmission to a group of Rx UEs, where Rx group membership may be known in advance. Broadcast refers to a Tx UE broadcasting an SL transmission such that all Rx UEs within receive range of the Tx UE that satisfy some criteria can successfully decode the data. In some examples, HARQ feedback may be supported for unicast and groupcast transmission, but not for broadcast transmission.

Example embodiments of systems and methods described below relate to CG resource allocation for use in NR V2X which does not rely on SCI accompanying every TB transmission to an Rx UE. In this regard, at least some SL data transmissions are performed without an associated transmission indicating the SL resources used for the SL data transmissions. Thus, in example embodiments, a Tx UE and an Rx UE are each semi-persistently provided with a CG configuration that can be used for multiple SL data transmissions such that a CG configuration indication does not have to be transmitted in association with each individual data transmission, as SCI or otherwise, during a duration that the CG configuration is applied. A number of example embodiments will now be described.

(1) Tx UE Sends a One-Time SCI to Inform the Rx UE(s) of a Change in CG Configuration In a first example embodiment, Tx UE (e.g., UE1) is provided with a first CG configuration by BS and indicates the first CG configuration to Rx UE (e.g., UE2) using SCI on a SL control channel as described above in respect of FIG. 1. The first CG configuration SCI may be sent in association with an SL data transmission. Subsequently, the Tx UE may send SL data transmissions (for example multiple different TB transmissions), to the Rx UE using the first CG configuration without any accompanying signaling to the Rx UE about the CG configuration. The Rx UE receives and decodes any received SL data transmissions using the first CG configuration. The Tx UE then detects an event that requires a change in one or more parameters of the CG configuration. The Tx UE then selects an updated CG configuration (which may for example include one or more updated resource or other parameters than the existing CG configuration) and applies the updated CG configuration parameters to the next data transmission sent to the Rx UE. In association with the data transmission using the updated parameter(s), the Tx UE also transmits SCI that specifies the updated CG configuration over the SL control channel to the Rx UE. The Rx UE decodes the SCI and uses the updated CG configuration to receive and decode the data transmission.

Accordingly, in this first example embodiment, SCI indicating CG configuration is transmitted only when an update in the CG configuration is required. In some examples, the updated CB configuration parameters can be one or more of the CB configuration parameters identified above.

In some examples, an event that may cause the Tx UE to determine that a parameter update is required can be a determination by the Tx UE that SL channel conditions have changed. For example, Tx UE may detect a change in channel reliability based on NACK or ACK feedback, and select one or more different parameters to adjust to the change. Alternatively, Tx UE may detect a change in channel conditions based on sensed data channel parameters such as received signal strength indicator (RSSI) or reference signal received power (RSRP) measurements. The changes in channel reliability or channel condition may for example be caused by changes in relative UE speed and inter-UE distance, among other things. In some examples, an event that may cause the Tx UE to determine that a parameter update is required may be signaling of a new CG configuration from the BS.

This first example embodiment can be applied in both NR V2X Mode 1 and Mode 2, although it may be most applicable in scenarios where a Tx UE has some autonomy to dynamically select from a pool or set of CG configuration parameters, as is the case with NR V2X Mode 2. Thus, in some examples where this first example embodiment is applied in the context of NR V2X Mode 1, the CG configuration provided by the BS may include a set of CG configuration parameters that the Tx UE can select from.

In an example use case, a UE1 may have been previously configured with a CG configuration by a BS. UE1 goes out of DL coverage of the BS, but is within SL coverage of UE2. The UE2 may send CG configuration update to UE1 via SCI. In another example, initially both a Tx UE and a Rx UE may receive a CG configuration from a BS. However, the BS may only update the CG configuration on Tx UE. Then the Tx UE sends a one-time configuration SCI to the Rx UE to update the CG configuration.

Updating the CG configuration via a one-time SCI allows the Rx UE to obtain the resource and parameters for receiving and decoding an SL transmission transmitted using a CG configuration. In such cases, a data transmission will not need an associated SCI to dynamically indicate all the respective resource parameters for each SL transmission.

In some examples, a Tx UE may periodically send out a CG configuration to a Rx UE using SCI.

In example embodiments the updated or periodic CG configurations can be transmitted by the Tx UE for a single Rx UE in the case of a unicast, for a defined group in the case of groupcast, or for suitably configured Rx UEs within SL range in the case of a broadcast.

(2) BS Provides CG Configuration to Both Tx UE and Rx UE

Figure 2:
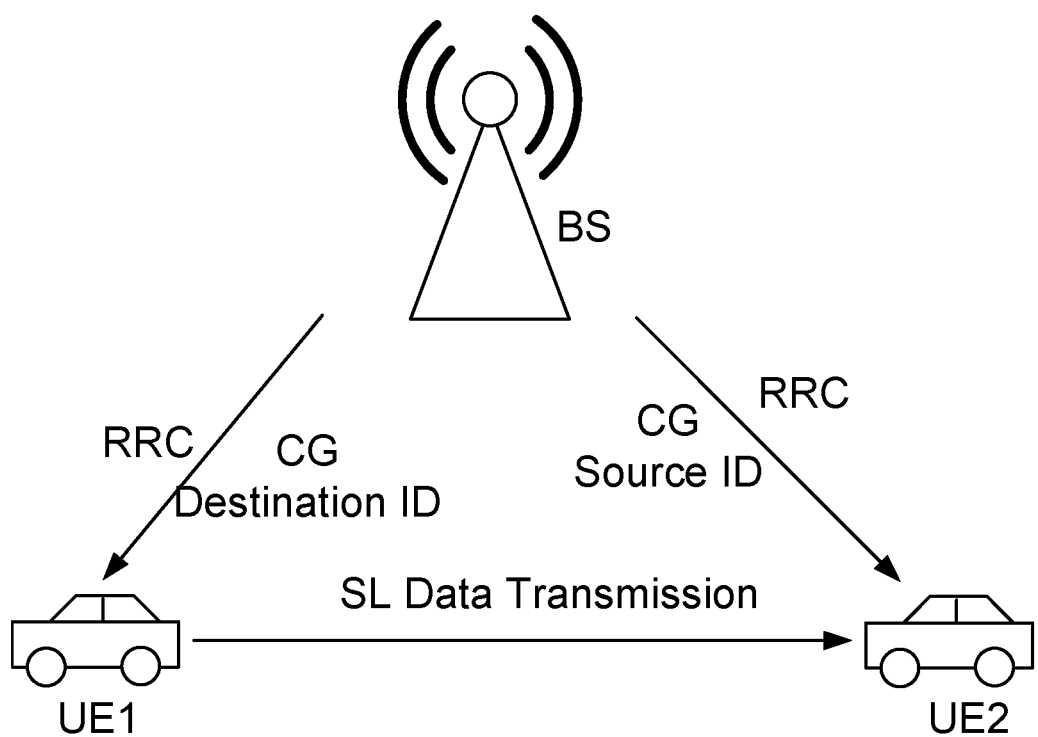
FIG. 2 is a block diagram illustrating communication of a configured grant for purposes of sidelink communication according to a further example embodiment.

With reference to FIG. 2, in a second example embodiment, the BS (e.g. gNB Node) may semi-statically provide CG configurations to both of Tx UE (e.g., UE1) and Rx UE(s) (e.g., UE2) using DL signaling. The Tx UE and Rx UE(s) may then use the specified CG configurations to transmit and receive SL data transmissions, respectively. In example embodiments, the same CG configuration will be used until the BS provides an updated CG configuration.

In one example, a BS may use separate DL signaling to indicate a Tx CG configuration to Tx UE and to indicate a Rx CG configuration to RX UE(s). In the case of a UE that is configured as both a Tx and Rx UE, the Tx CG configuration and Rx CG configuration can both be sent to the UE. Most parameters in the Tx and Rx CG configurations may be identical, however some parameters may be different. For example, the Rx CG configuration may specify a source ID that identifies the Tx UE. The Tx CG configuration may specify: a single destination ID that identifies a single Rx UE in the case of a unicast; a target group destination ID (e.g. ID(s) that identify a target Rx UE group) in the case of an SL groupcast; or a broadcast destination ID in the case of a SL broadcast.

In the case of NR V2X Mode 1 Type 1, RRC signaling may be used to indicate the Tx CG configuration to Tx UE and to indicate the Rx CG configuration to RX UE(s). In the case of NR V2X Mode 1 Type 2, both RRC and DCI signaling may be used to indicate the CG configurations.

In another example, the same CG configuration may be sent to both the Tx UE and Rx UE(s) via a single broadcast or multicast signaling, e.g. a group RRC for Type 1 CG or group common DCI for Type 2 CG. Along with the CG configuration, a destination ID and source ID may be optionally included in the configuration signaling for the SL transmission.

(3) PC5 RRC CG Configuration

Figure 3:
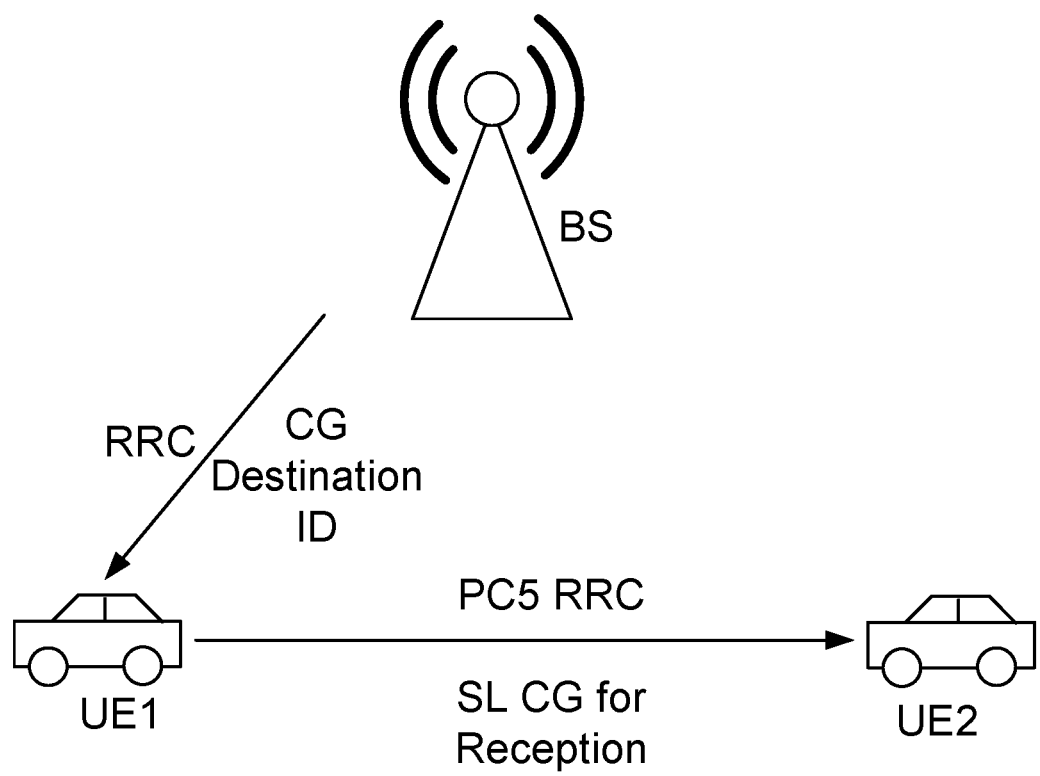
FIG. 3 is a block diagram illustrating communication of a configured grant for purposes of sidelink communication according to a further example embodiment.

With reference to FIG. 3, in a third example embodiment, the BS uses DL RRC signaling to indicate a CG configuration (or set of CG configurations) to Tx UE (e.g., UE1). The CG configuration is indicated by the BS on a semi-static basis and may include, among other resource and transmission parameters, and a destination ID for target Rx UE(s) (e.g., UE2). In the case of CG configuration intended for a unicast, the destination ID may be a single the target Rx UE ID for reception. In the case of groupcast, the destination ID may be the ID target Rx UE group. For broadcast, the destination ID may be for all potential Rx UEs.

Tx UE then indicates the CG configuration to Rx UE(s) using PC5 RRC signaling. As known in the art, PC5 RRC is a type of UE to UE higher layer control signaling that is conveyed by Tx UE to Rx UE through a physical sidelink data channel (e.g. a physical sidelink shared channel (PSSCH)) rather than a physical sidelink control channel (e.g. a physical sidelink control channel (PSCCH)). PC5 RRC signaling is similar to DL RRC signaling except that it is signaled in an SL channel rather than a DL channel.

The CG configuration indicated using PC5 RRC signaling may include, among other resource and transmission parameters, a source ID for the Tx UE. A Rx UE that receives the CG configuration indication will then apply that CG configuration in a semi-persistent manner to future data transmission from the Tx UE over the SL data channel until the Rx UE receives a subsequent PC5 RRC signal indicating an updated CG configuration.

In this example embodiment, because the Tx UE is receiving DL RRC signaling indicating a CG configuration, at least the Tx UE is within coverage of the BS. The Rx UE (or Rx UEs) may or may not be within BS DL coverage, but it (they) are at least in the SL communication range of Tx UE. Therefore, this example embodiment is at least applicable to NR N2X Mode 1 SL CG. In some scenarios, an SL CG configuration according to this example embodiment may be also considered for NR N2X Model 2 SL transmissions because it can be used when the Rx UE(s) are out of BS coverage.

(4) Pre-Configuration

Figure 4:
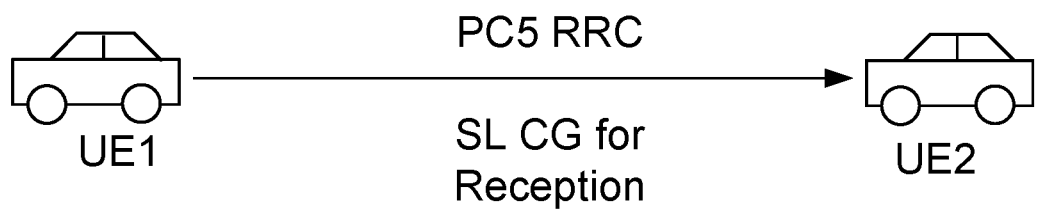
FIG. 4 is a block diagram illustrating communication of a configured grant for purposes of sidelink communication according to another example embodiment.

Referring to FIG. 4, a further example embodiment is appropriate for use when UEs are out of BS DL coverage. In this regard, in example embodiments, a Tx UE (e.g. UE1) is preconfigured with a set or pool of candidate CG configurations. The Tx UE may be preconfigured with the CG configuration pool in a number of different ways. For example, the Tx UE can be preconfigured with a CG configuration pool by DL RRC signaling from a BS before the Tx UE goes out of BS DL coverage, or by a system information block (SIB).

The Tx UE selects a CG configuration from the CG configuration pool and indicates that CG configuration to Rx UE(s) (e.g., UE2). The CG configuration could for example be indicated using PC5 RRC signaling, or in alternative examples using SCI.

A Rx UE that receives the CG configuration indication will then apply that CG configuration in a semi-persistent manner to future data transmission from the Tx UE over the SL data channel until the Rx UE receives a subsequent SL signal indicating an updated CG configuration.

In this regard, in example embodiments, a Tx UE can select an initial CG configuration from its pre-configured CG configuration pool based on sensed SL channel conditions. The Tx UE indicates that CG configuration to Rx UEs (using PC5 RRC signaling, or in alternative examples using SCI) and applies the CG configuration to SL data communications until the Tx UE detects an event that requires a change the CG configuration (for example, when the Tx UE senses channel conditions that require a change). The Tx UE then selects an updated CG configuration (which may for example include one or more updated resource or other parameters than the existing CG configuration) and applies the updated CG configuration to the next data transmission sent to the Rx UE. In advance of or together with the data transmission using the updated parameter(s), the Tx UE also transmits an updated CG configuration indication that specifies the updated CG configuration to the Rx UE. The Rx UE then updates the CG configuration to receive and decode the data transmission and future transmissions until it receives yet a further CG configuration update indication from the Tx UE. In some examples, the Rx UE applies the updated CG configuration only for a pre-configured time duration (e.g. until a pre-configured timer triggered by the configuration SCI expires)

In some examples, sensing by the TX UE may be similar to that discussed above in respect of the first example embodiment.

In this example embodiment, both Tx UE and Rx UE can be out of BS DL coverage. Therefore, this embodiment is suitable for an NR V2X SL Mode 2 CG transmission scheme. In some embodiments, the Tx UE may be in DL coverage but autonomously selects a CG configuration grant or configured grant parameter from its pre-configured set of CG configurations or set of CG configuration parameters with a CG configuration without BS instruction, in which case the above embodiments could also be applicable in a version of NR V2X SL Mode 1.

(5) GF Configuration for Broadcast

Although PC5 RRC can be used to broadcast a CG configuration indication from one Tx UE to all other UEs within SL coverage or groupcast from one Tx UE to other UEs in a group of UEs, providing CG configuration via PC5 RRC may not be feasible in some cases.

Accordingly, in an example embodiment, a grant free (GF) configuration for broadcast can be indicated by the Tx UE through sending of periodic SCI, carried in a PSCCH, containing the CG configuration details. The CG configuration SCI can be a one-time only SCI. However, because the Tx UE neighborhood may change over time due for example to UE mobility, then sending an CG configuration using periodic SCI can be useful to make sure all Rx UEs in the vicinity of the Tx UE are able to receive the CG sidelink transmissions.

Another method to convey the CG configuration in sidelink for a broadcast service is through the physical layer broadcast channel (PSBCH). PSBCH signaling sent periodically by the Tx UE may contain the CG configuration information needed to configure the Rx UEs. A certain number of bits in a PSBCH transmission can be dedicated to conveying the CG configuration details.

(6) Tx UE Sends Information about CG Configuration Parameters or Updates to the CG Configuration Parameters to the Rx UE Through Data Channel Signaling without Using SCI.

In a further example embodiment where no SCI signaling is used, a Tx UE sends information about selected CG configuration parameters (such as source and destination IDs) to the Rx UE through signaling transmitted in the data channel or embedded in the SL data channel (e.g., PSCCH) to inform the RX UE(s) of changes in the selected parameters.

In the case of unicast, the destination ID may be the Rx UE ID for reception. In the case of groupcast, the destination ID may be the ID of the target receive UE group. For broadcast, the destination ID may be for all potential Rx UEs.

In example embodiments, source and destination IDs are generated at the Tx UE and thus are not included in the CG configuration provided by the BS. The Source ID/Destination ID need to be indicated by Tx UE to the Rx UE. In a typical grant-based scheme, such indication would be carried in SCI which is conveyed by a PSCCH associated with the PSSCH carrying the data. In the case of a CG scheme, there is a possibility that no SCI is transmitted, i.e. a data transmission (e.g. a TB) is transmitted in a standalone PSSCH that is not associated with any PSCCH.

In example embodiments the Tx UE may need to inform an Rx UE(s) of one or both of a source ID and a destination ID in the absence of PSCCH SCI. In this regard, two possible options to inform Rx UE(s) about Source/Destination ID or any other configuration parameters that would otherwise be carried in a PSCCH in a grant-based scheme are:

1. Option 1: A Sidelink Medium Access Control-Control Element (MAC-CE) comprising the source and/or destination ID is attached or appended to the data before the actual PSSCH data transmission on the CG resource allocated for the data transmission by PC5 RRC signaling such that the MAC-CE is jointly coded with the payload data included in a PSSCH data transmission.

Option 2: Source and/or destination ID is transmitted separately on a specific resource within the whole resource configured by PC5 RRC signaling, and Source/Destination ID separately coded from the payload data is included in a PSSCH data transmission even though both are transmitted using the semi-statically configured CG resources or semi-persistently scheduled (SPS) resources.

Accordingly, in one example embodiment where no SCI signaling used, Tx UE sends information about selected CG configuration parameters (such as source and destination IDs) to the Rx UE through signaling transmitted in the data channel to inform the RX UE(s) of the selected parameters or updates to the selected parameters.

Apparatus Descriptions

Figure 5:
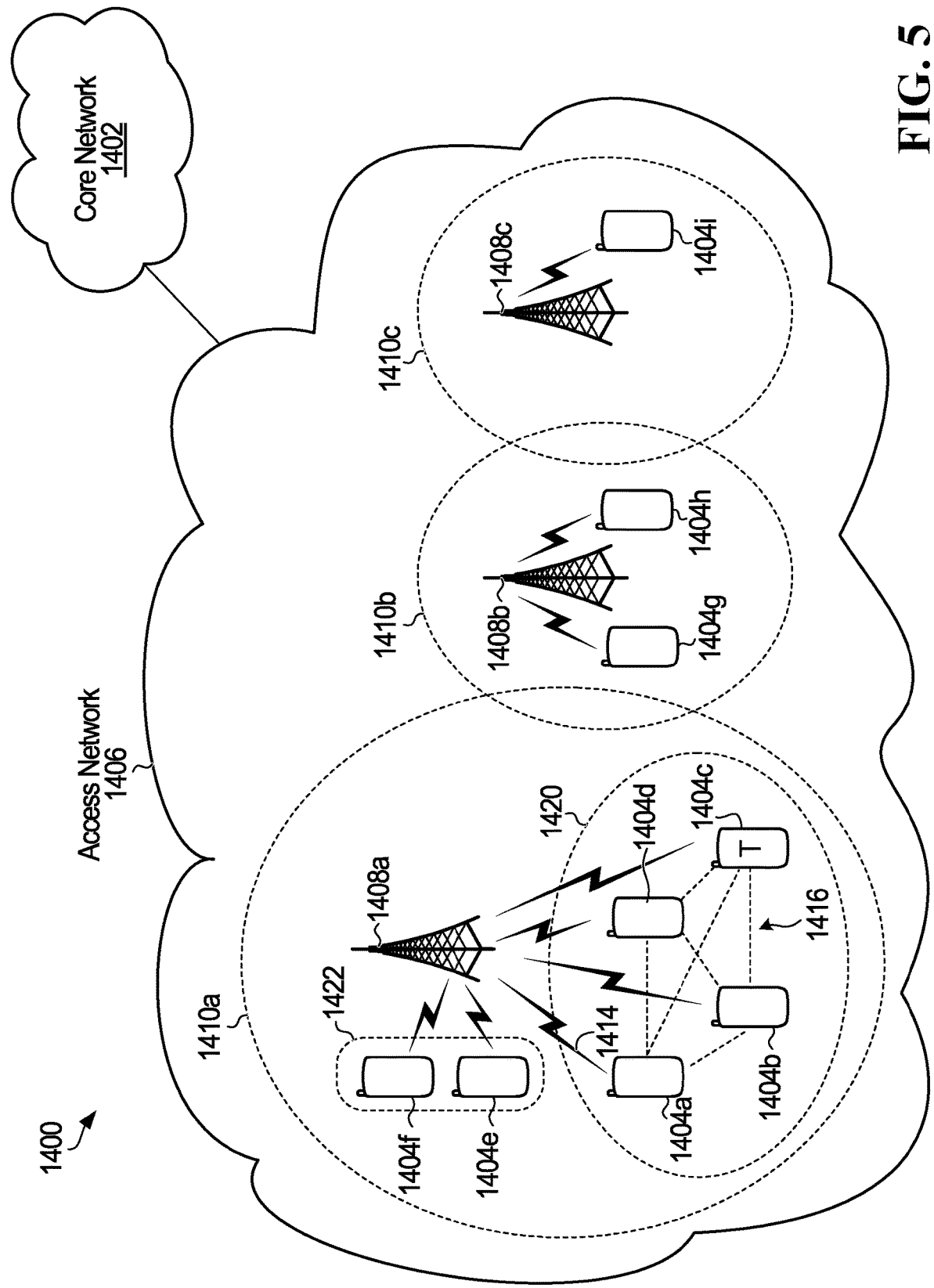
FIG. 5 is a block diagram illustrating an example of a telecommunications network according to one embodiment.

FIG. 5 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i (which may include UE1 and UE2). The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provide a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. The UEs 1404a-d can each wirelessly communicate with the BS 1408a. The UEs 1404a-d can also directly communicate with each other, as represented at 1416. The communications represented at 1416 are direct communications between UEs that do not go through an access network component, such as a BS. As shown in FIG. 2, UE to UE communications 1416 are directly between the UEs 1404a-d and are not routed through the BS 1408a, or any other part of the access network 1406. Communications 1416 may also be referred to as lateral communications or sidelink (SL) communications. In embodiments disclosed herein, UE to UE communications 1416 use an SL channel and an SL air interface, including for example the SL PC5 interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), 5G New Radio, and WiFi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface. The UE group 1420 as a whole can act as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE (TUE). In the examples above, UE 1404c is being assisted and is therefore a TUE. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420. In example embodiments described above, UE1 and UE2 are part of a UE group.

There may be more than one UE group. For example, UEs 1404e and 1404f in FIG. 5 form another UE group 1422.

Figure 6:
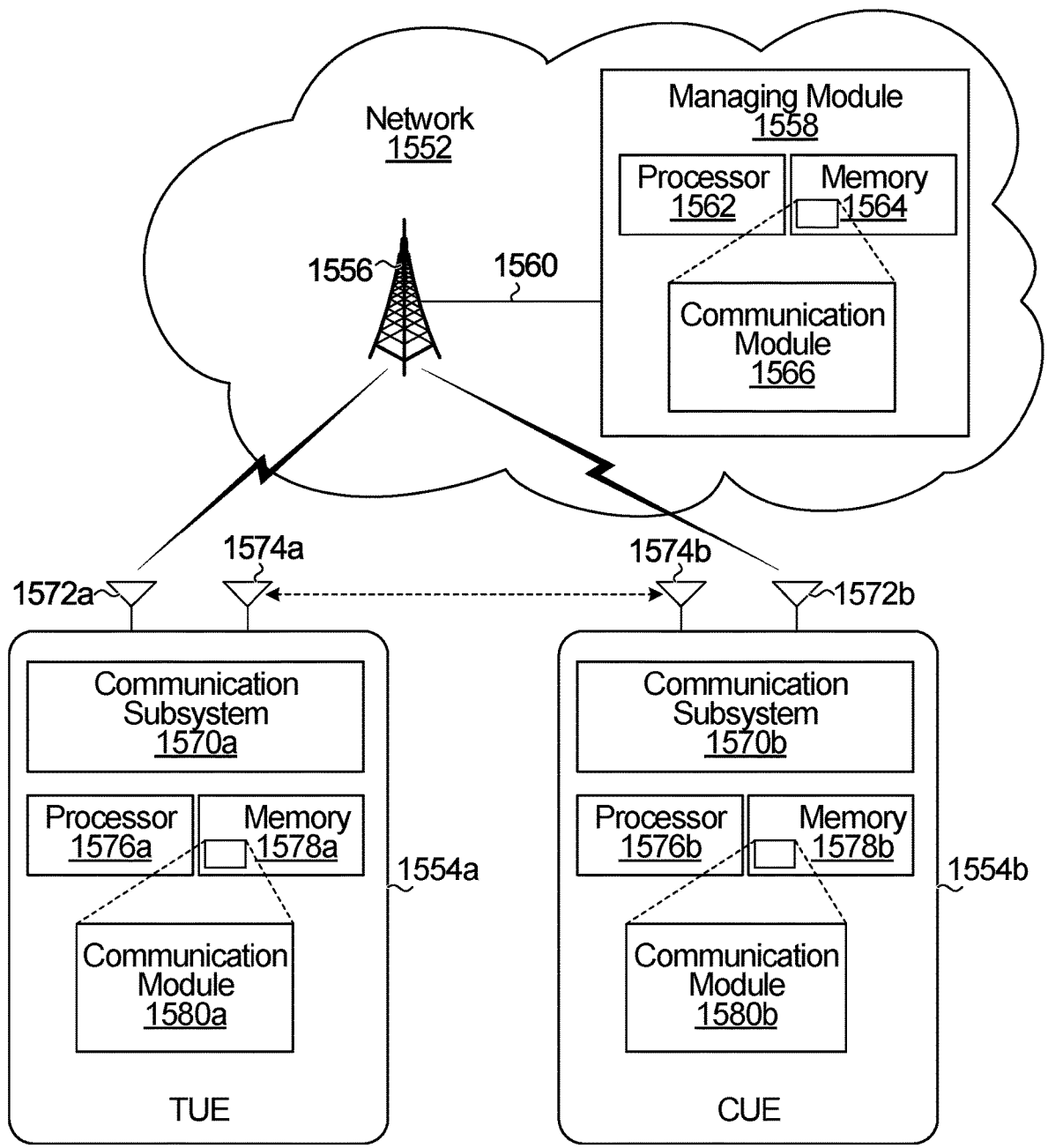
FIG. 6 is a block diagram illustrating an example of a network serving two UEs.

FIG. 6 is a block diagram illustrating an example of a network 1552 serving two UEs 1554a and 1554b, according to one embodiment. The network 1552 may be the access network 1406 from FIG. 5, and the two UEs 1554a and 1554b may be two of the four UEs 1404a-d in FIG. 5, and may, for example, be used to implement UE1 and UE2 described above. However, more generally this need not be the case, which is why different reference numerals are used in FIG. 6.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574*a* may be a Bluetooth™ antenna. SL communications could also or instead be over licensed or unlicensed spectrum.

The UE 1554*b* includes the same components described above with respect to the UE 1554*a*. That is, UE 1554*b* includes communication subsystem 1570*b*, antennas 1572*b* and 1574*b*, processor 1576*b*, memory 1578*b*, and communication module 1580*b*.

The UE 1554*a* is designated as a target UE (TUE) and will therefore be called TUE 1554*a*. The UE 1554*b* is a cooperating UE and will therefore be called CUE 254*b*. The CUE 1554*b* may be able to assist with wireless communications between the BS 1556 and TUE 1554*a* if a UE group were to be established that included TUE 1554*a* and CUE 1554*b*. Other communication scenarios are also contemplated, in a V2X application, for example.

UE 1554*a* may be specifically chosen as the target UE by the network 1552. Alternatively, the UE 1554*a* may itself determine that it wants to be a target UE and inform the network 1552 by sending a message to the BS 1556. Example reasons why UE 1554*a* may choose or be selected by the network 1552 to be a target UE include: low wireless channel quality between the UE 1554*a* and the BS 1556, many packets to be communicated between the BS 1556 and the UE 1554*a*, and/or the presence of a cooperating UE that is a good candidate for helping with communications between the BS 1556 and the UE 1554*a*.

UE 1554*a* need not always stay a target UE. For example, UE 1554*a* may lose its status as a target UE once there is no longer a need or desire for assistance with wireless communications between UE 1554*a* and the BS 1556. UE 1554*a* may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554*a* acts only as a target UE, i.e., TUE 1554*a*, and the UE 1554*b* is a cooperating UE to the TUE 1554*a*, i.e., CUE 1554*b*.

FIGS. 5 and 6 illustrate systems in which embodiments could be implemented. In some embodiments, a UE includes a processor, such as 1576*a*, 1576*b* in FIG. 6, and a non-transitory computer readable storage medium, such as 1578*a*, 1578*b* in FIG. 6, storing programming for execution by the processor. A non-transitory computer readable storage medium could also or instead be provided separately, as a computer program product.

Figure 7:
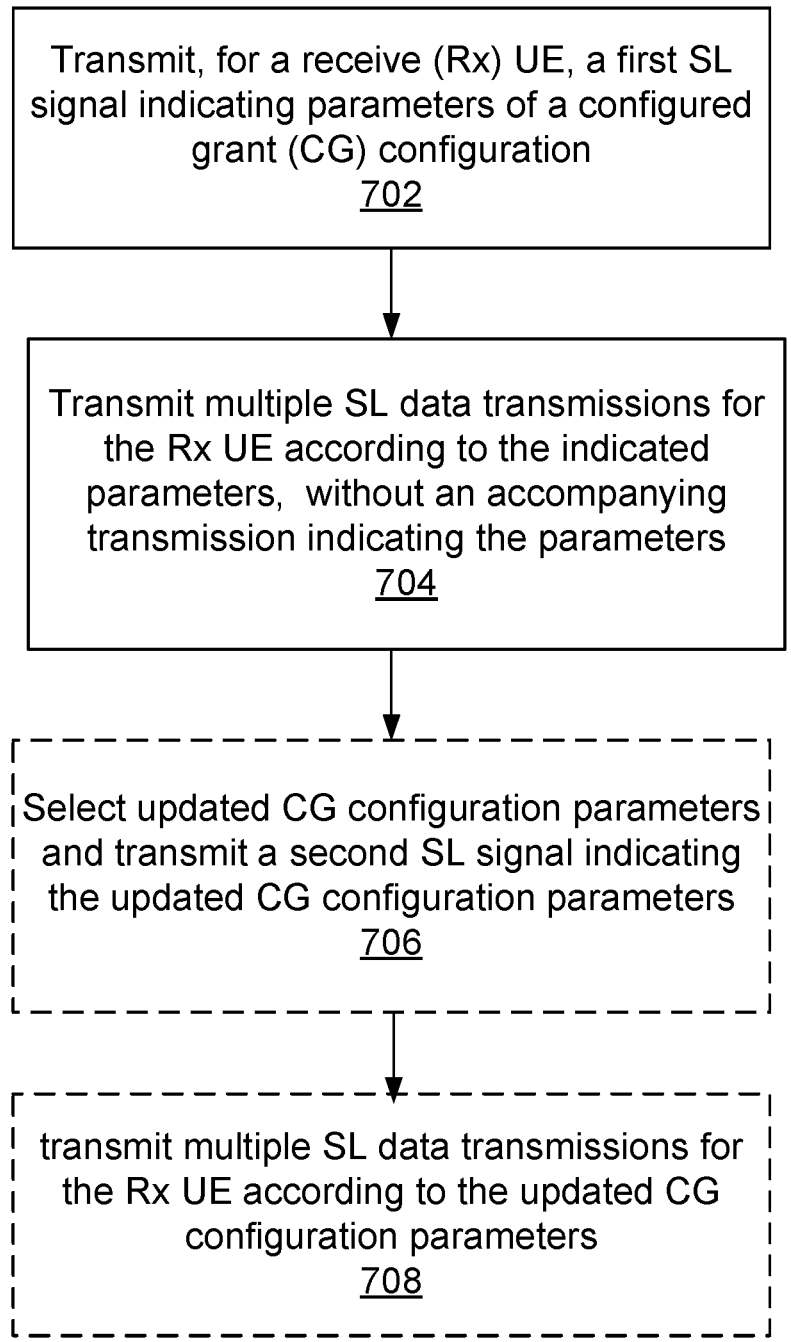
FIG. 7 is a flow chart of a process that may be performed by a Tx UE that is configured for wireless SL communication, according to example embodiments.

FIG. 7 is a flow chart of a process that may be performed by a Tx UE (e.g., UE1) that is configured for wireless SL communication, in accordance with one or more of the embodiments described above. As indicated at block 702, the Tx UE transmits, for a receiving (Rx) UE (e.g., UE2), a first SL signal indicating parameters of a configured grant (CG) configuration. As indicated at block 704, the Tx UE then transmits multiple SL data transmissions in a sidelink data channel for the Rx UE according to the indicated parameters, wherein at least one of the SL data transmissions is transmitted without an accompanying transmission in an SL control channel indicating the parameters.

In at least some examples, the first SL signal comprises sidelink control information (SCI) and is transmitted in the SL control channel.

As indicated in block 706, in some examples the Tx UE may select updated CG configuration parameters and transmit, for the receiving (Rx) UE, a second SL signal comprising SCI indicating the updated CG configuration parameters. In some examples, the Tx UE may be triggered to select the updated CG configuration based on changes in SL data channel properties. In this regard, the Tx UE may sense SL channel information and select suitable updated CG configuration parameters.

As indicated in block 708, in some examples, the Tx UE may then transmit multiple SL data transmissions for the Rx UE according to the updated CG configuration parameters, wherein at least one of the SL data transmissions is transmitted without an accompanying transmission indicating the updated CG configuration parameters. In at least some examples, the updated CG configuration parameters update only a subset of the parameters indicated in the first signal.

As indicated above in respect of at least FIGS. 1, 2 and 4, in some examples the Tx UE may, prior to transmitting the first signal, receive signaling from a base station (BS) indicating the CG configuration.

As indicated above in respect of at least FIGS. 3 and 4, in some examples the first SL signal is transmitted using radio resource control (RRC) signaling in the SL data channel. In some examples, the first SL signal is transmitted using a physical layer broadcast channel (PSBCH).

In at least some example embodiments, the CG configuration relates to a grant free (GF) configuration for a broadcast for multiple Rx UEs, wherein the first signal is transmitted for multiple Rx UEs and: (i) the first SL signal comprises sidelink control information (SCI) sent in the SL control channel; or (ii) the first SL signal is transmitted using a PSBCH transmission. The Tx UE may transmit a second SL signal for the multiple Rx UEs in the SL data channel indicating updated CG configuration parameters.

In at least some example embodiments, the CG configuration includes a set of parameters selected from a group including: (1) destination ID of one or more Rx UEs; (2) source ID of the Tx UE; (3) SL data channel time-frequency resource; (4) modulation and coding scheme (MCS) parameters to be used for SL data transmission; and (5) demodulation reference signal (DMRS) parameters.

In some examples, the Tx UE transmits an indication of one or both of a source ID for the Tx UE or a destination ID for the Rx UE in the SL data channel. In some example embodiments, the Tx UE transmits the indication of one or both of the source ID and the destination ID by: coding a Medium Access Control-Control Element (MAC-CE) that indicates one or both of the source ID and destination ID; and jointly coding the MAC-CE with payload data in one of the multiple data transmissions. In some alternative examples, the Tx UE transmits the indication of one or both of the source ID and the destination ID by transmitting the indication using a SL data channel time-frequency resource that is not used for any of the multiple data transmissions.

In some examples, the method includes periodically transmitting for the Rx UE, SCI SL signals to update parameters of the configured grant (CG) configuration applied by the Rx UE.

In the above non-broadcast examples, the Tx UE can perform the stated operations for a single Rx E (unicast) or for multiple Rx UEs (multicast), in which each Rx UE is provided with a respective CG configuration to semi-persistently apply to a set of SL data transmissions.

Figure 8:
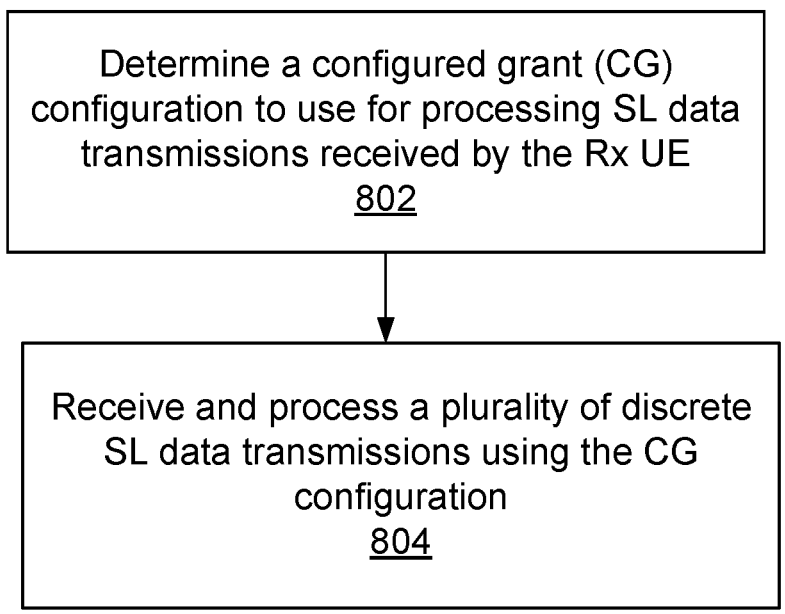
FIG. 8 is a flow chart of a process that may be performed by a Rx UE that is configured for wireless SL communication, according to example embodiments.

FIG. 8 is a flow chart of a process that may be performed by a Rx UE that is configured for wireless SL communication, according to example embodiments. As indicated at block 802, the Rx UE determines a configured grant (CG) configuration to use for processing SL data transmissions received by the Rx UE. As indicated in block 804, the Rx UE then receives and processes a plurality of discrete SL data transmissions using the CG configuration. In some example embodiments, the Rx UE determines the CG configuration by receiving sidelink control information (SCI) over an SL control channel indicating the CG configuration, and at least one of the plurality of discrete SL data transmissions is received over an SL data channel without accompanying SCI indicating the CG configuration.

In the examples of FIGS. 7 and 8, a Tx UE and a Rx UE are each semi-statically provided with a CG configuration such that a CG configuration indication does not have to be transmitted in association with each individual data transmission during a duration that the CG configuration is applied.

Numerous modifications and variations of the present disclosure are possible in light of the above teachings. It is therefore to be understood that within the scope of the appended claims, the disclosure may be practiced otherwise than as specifically described herein.

The invention claimed is:

1. A method, comprising:
   transmitting, by a transmitting (Tx) user equipment (UE) for a receiving (Rx) user equipment (UE), a first sidelink (SL) signal indicating configured grant (CG) configuration parameters, the CG configuration parameters for allocating a set of transmission resources; and
   transmitting, by the Tx UE, multiple SL data transmissions for the Rx UE in a SL data channel according to the CG configuration parameters on the set of transmission resources, wherein at least one of the multiple SL data transmissions is transmitted without being scheduled by a respective transmission in a physical SL control channel (PSCCH) indicating the CG configuration parameters, the Tx UE semi-statically applying the CG configuration parameters with effect that the CG configuration parameters do not have to be transmitted in association with each individual SL data transmission from the Tx UE to the Rx UE during a duration that the CG configuration is applied.

2. The method of claim 1, wherein the first SL signal comprises sidelink control information (SCI) and is transmitted in the PSSCH.

3. The method of claim 2, further comprising:
   selecting, at the Tx UE, updated CG configuration parameters and transmitting, for the Rx UE, a second SL signal comprising SCI in the PSCCH indicating the updated CG configuration parameters.

4. The method of claim 3, comprising transmitting further multiple SL data transmissions in the SL data channel for the Rx UE according to the updated CG configuration parameters, wherein at least one of the further multiple SL data transmissions is transmitted without a respective transmission in the PSCCH indicating the updated CG configuration parameters.

5. The method of claim 4 wherein the updated CG configuration parameters update only a subset of the parameters indicated in the first SL signal.

6. The method of claim 1 comprising transmitting an indication of one or both of a source ID for the Tx UE or a destination ID for the Rx UE in the SL data channel.

7. The method of claim 6, wherein transmitting the indication of one or both of the source ID and the destination ID comprises: coding a Medium Access Control-Control Element (MAC-CE) that indicates one or both of the source ID and destination ID; and jointly coding the MAC-CE with payload data in one of the multiple SL data transmissions.

8. The method of claim 6, wherein transmitting the indication of one or both of the source ID and the destination ID comprises transmitting the indication using a time-frequency resource in the SL data channel, wherein the time-frequency resource is not used for any of the multiple SL data transmissions.

9. The method of claim 1 comprising, prior to transmitting the first SL signal, receiving signaling from a base station (BS) indicating the CG configuration parameters.

10. The method of claim 1 wherein the first SL signal is transmitted using radio resource control (RRC) signalling in the SL data channel or transmitted in a physical layer broadcast channel (PSBCH).

11. The method of claim 1, wherein the CG configuration parameters relates to a grant free (GF) configuration for a broadcast for multiple Rx UEs, wherein the first SL signal is transmitted for multiple Rx UEs and: (i) the first SL signal comprises sidelink control information (SCI) and is transmitted in the PSCCH; or (ii) the first SL signal is transmitted using a PSBCH transmission, the method further comprising transmitting a second SL signal for the multiple Rx UEs in a SL data channel transmission indicating updated CG configuration parameters.

12. The method of claim 1 wherein the CG configuration parameters include a set of parameters selected from a group including: (1) destination ID of one or more Rx UEs; (2) source ID of the Tx UE; (3) SL data channel time-frequency resource; (4) modulation and coding scheme (MCS) parameters to be used for SL data transmission; and (5) demodulation reference signal (DMRS) parameters.

13. The method of claim 1 comprising periodically transmitting for the Rx UE, SCI SL signals to update parameters of the configured grant (CG) configuration applied by the Rx UE.

14. An apparatus comprising at least one processor coupled with a non-transitory computer-readable medium storing instructions, wherein when the instructions executed by the at least one processor, cause the apparatus to:
   transmit, by a transmitting (Tx) user equipment (UE) for a receiving (Rx) user equipment (UE), a first sidelink (SL) signal indicating configured grant (CG) configuration parameters, the CG configuration parameters for allocating a set of transmission resources; and
   transmit, by the Tx UE, multiple SL data transmissions for the Rx UE in a SL data channel according to the CG configuration parameters on the set of transmission resources, wherein at least one of the multiple SL data transmissions is transmitted without being scheduled by a respective transmission in a physical SL control channel (PSCCH) indicating the CG configuration parameters, the Tx UE semi-statically applying the CG configuration parameters with effect that the CG configuration parameters do not have to be transmitted in association with each individual SL data transmission from the Tx UE to the Rx UE during a duration that the CG configuration is applied.

15. The apparatus of claim 14 wherein when the instructions are executed by the at least one processor, further cause the apparatus to select updated CG configuration parameters and transmit a second SL signal indicating the updated CG configuration parameters for the Rx UE.

16. The apparatus of claim 15, wherein when the instructions are executed by the at least one processor, further cause the apparatus to transmit further multiple SL data transmissions according to the updated CG configuration parameters, wherein at least one of the further multiple SL data transmissions is transmitted without a respective transmission in the PSCCH indicating the updated CG configuration parameters.

17. The apparatus of claim 14 wherein when the instructions are executed by the at least one processor, further cause the apparatus to, prior to transmitting the first SL signal, receive signaling from a base station (BS) indicating the CG configuration parameters.

18. The apparatus of claim 14 wherein the first SL signal comprises sidelink control information (SCI) transmitted in an SL control channel.

19. The apparatus of claim 14 wherein when the instructions are executed by the at least one processor, further cause the apparatus to transmit the first SL signal using radio resource control (RRC) signalling in the SL data channel or using a physical layer broadcast channel (PSBCH).

20. A computer program product comprising a non-transitory computer readable medium storing instructions for configuring a transmitting (Tx) user equipment to:
  transmit, for a receiving (Rx) UE, a first SL signal indicating configured grant (CG) configuration parameters, the CG configuration parameters for allocating a set of transmission resources; and
  transmit multiple SL data transmissions in a SL data channel for the Rx UE according to the indicated CG configuration parameters on the set of transmission resources, wherein at least one of the multiple SL data transmissions is transmitted without being scheduled by a respective transmission in a physical SL control channel (PSCCH) indicating the CG configuration parameters, the Tx UE semi-statically applying the CG configuration parameters with effect that the CG configuration parameters do not have to be transmitted in association with each individual SL data transmission from the Tx UE to the Rx UE during a duration that the CG configuration is applied.

21. The method of claim 1, wherein the first SL signal comprises sidelink control information (SCI) and is transmitted in the SL data channel, the SL data channel being a physical sidelink shared channel (PSSCH).

22. The method of claim 21, further comprising:
  selecting, at the Tx UE, updated CG configuration parameters and transmitting, for the Rx UE, a second SL signal comprising SCI in the SL data channel indicating the updated CG configuration parameters.

23. A method, comprising:
  receiving, from a transmitting (Tx) user equipment (UE), a first sidelink (SL) signal indicating configured grant (CG) configuration parameters, the CG configuration parameters for allocating a set of transmission resources; and
  receiving multiple SL data transmissions from the Tx UE in a SL data channel according to the CG configuration parameters on the set of transmission resources, wherein at least one of the multiple SL data transmissions is received without being scheduled by a respective transmission from the Tx UE in a physical SL control channel (PSCCH) indicating the CG configuration parameters, the Tx UE semi-statically applying the CG configuration parameters with effect that the CG configuration parameters do not have to be transmitted in association with each individual SL data transmission from the Tx UE to the Rx UE during a duration that the CG configuration is applied.

24. The method of claim 23, wherein the first SL signal comprises sidelink control information (SCI) and is received in the PSCCH.

25. An apparatus, comprising at least one processor coupled with a non-transitory computer-readable medium storing instructions, wherein when the instructions executed by the at least one processor, cause the apparatus to:
  receive, from a transmitting (Tx) user equipment (UE), a first sidelink (SL) signal indicating configured grant (CG) configuration parameters, the CG configuration parameters for allocating a set of transmission resources; and
  receive multiple SL data transmissions from the Tx UE in a SL data channel according to the CG configuration parameters on the set of transmission resources, wherein at least one of the multiple SL data transmissions is received without being scheduled by a respective transmission from the Tx UE in a physical SL control channel (PSCCH) indicating the CG configuration parameters, the Tx UE semi-statically applying the CG configuration parameters with effect that the CG configuration parameters do not have to be transmitted in association with each individual SL data transmission from the Tx UE to the Rx UE during a duration that the CG configuration is applied.

* * * * *